United States Patent Office 3,846,209
Patented Nov. 5, 1974

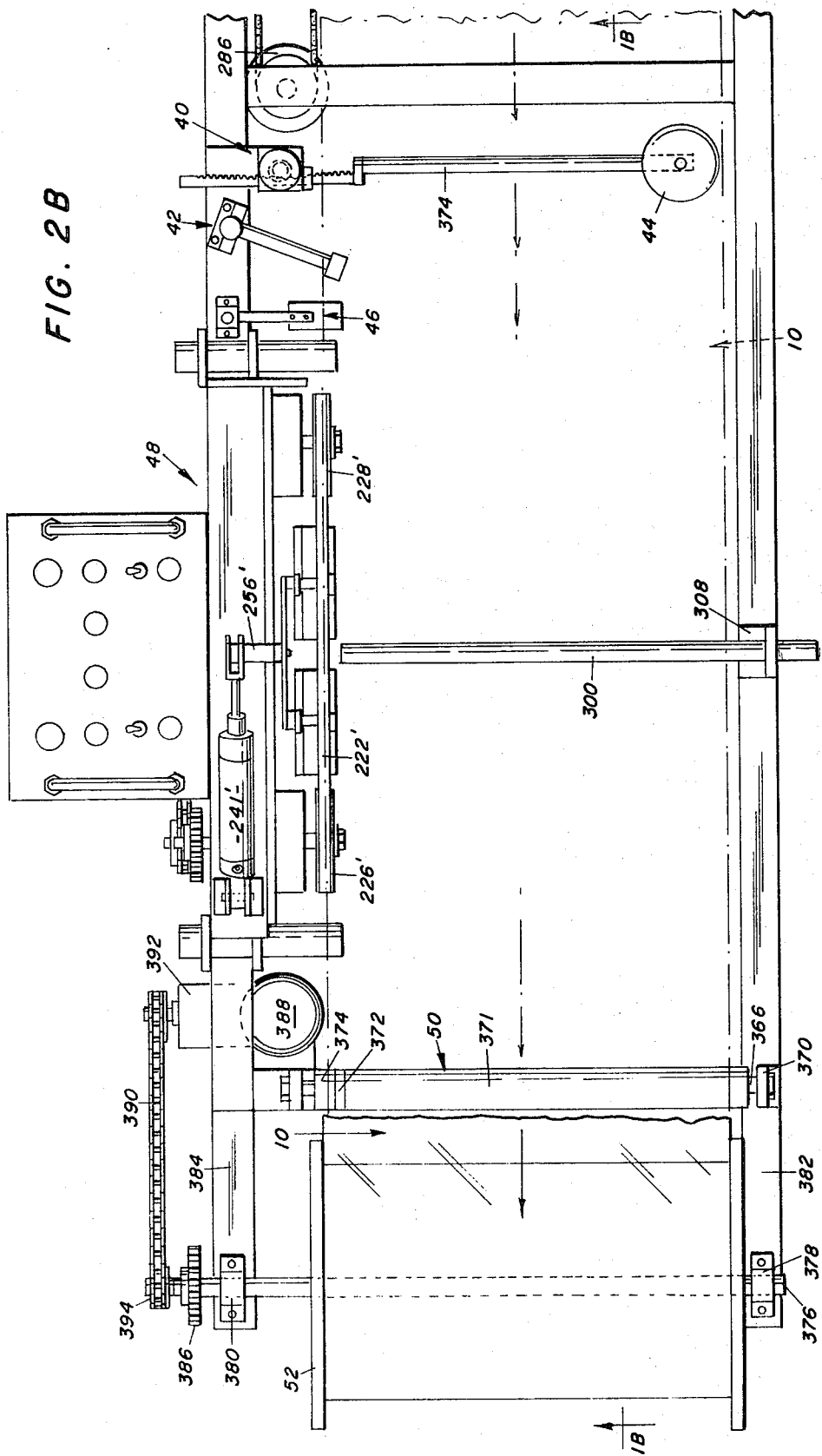

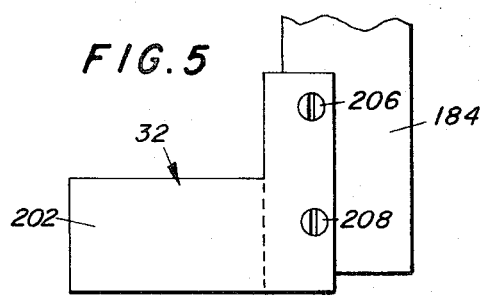
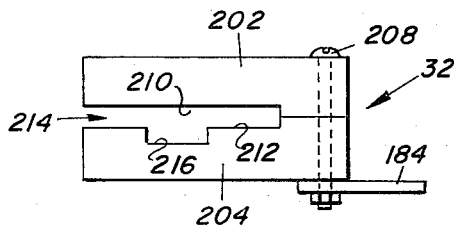
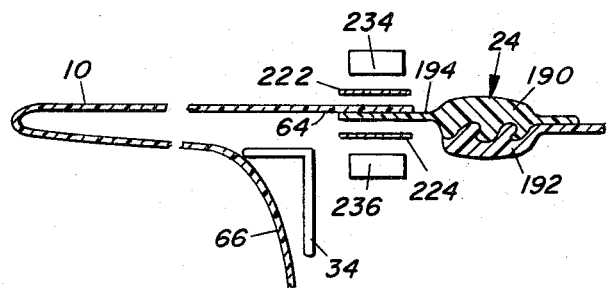
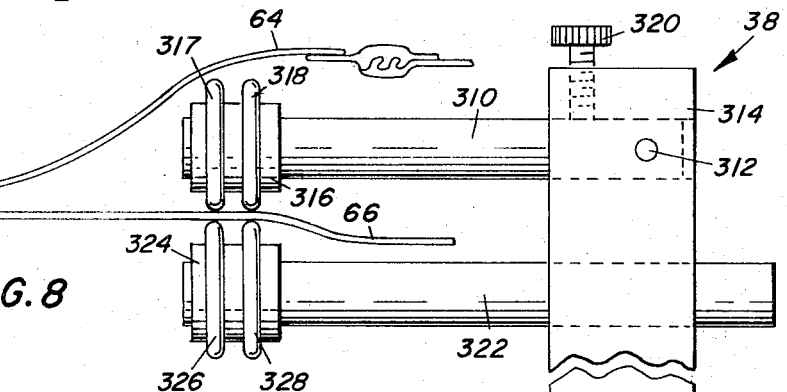
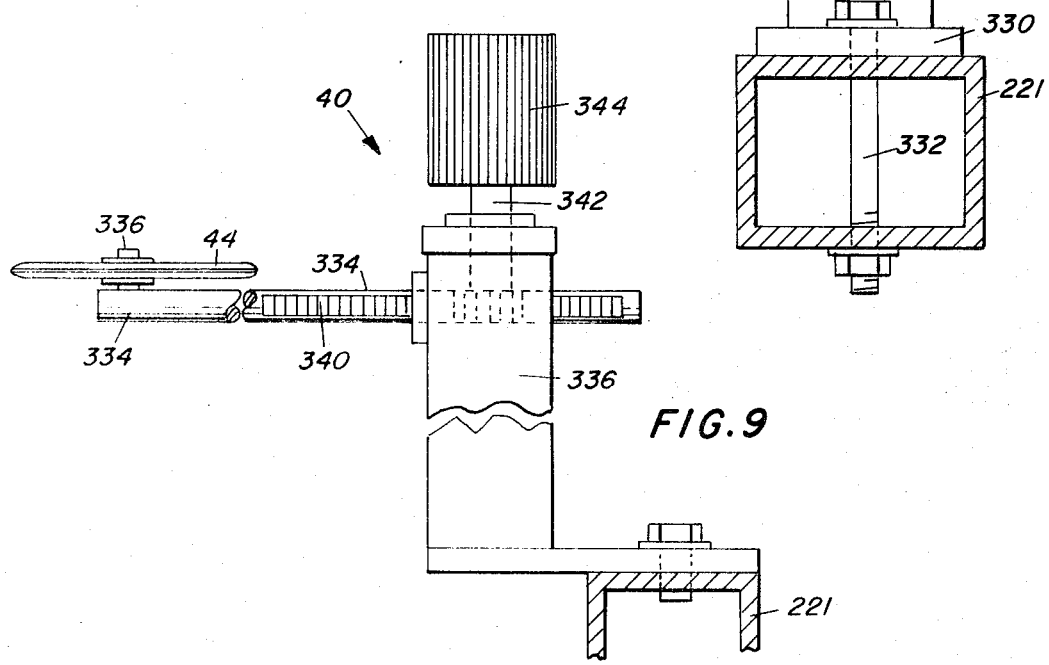

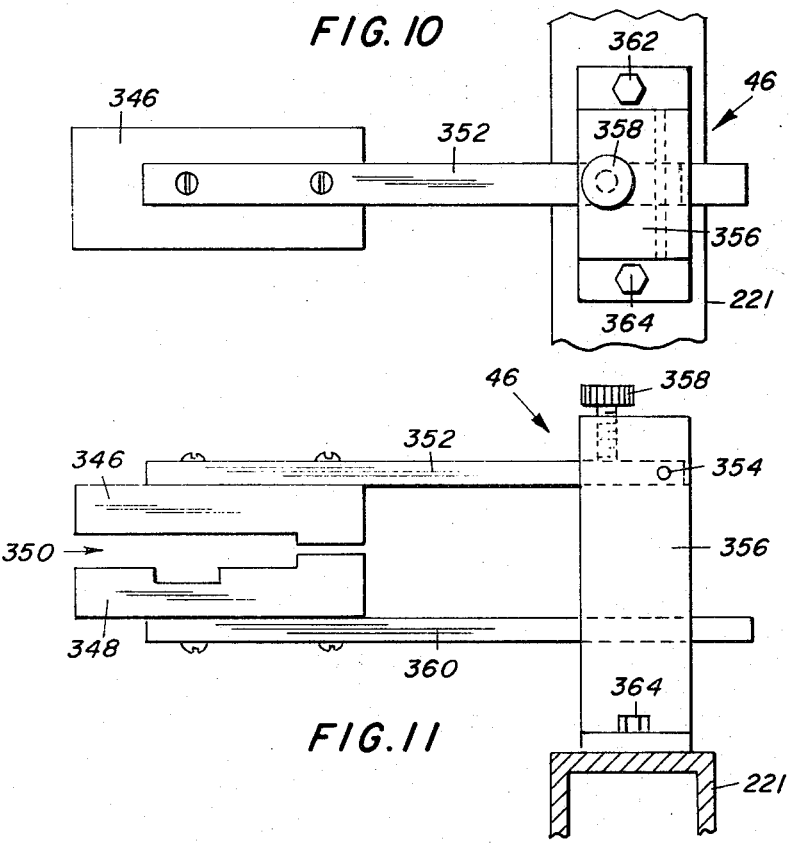
FIG. 10
FIG. 11
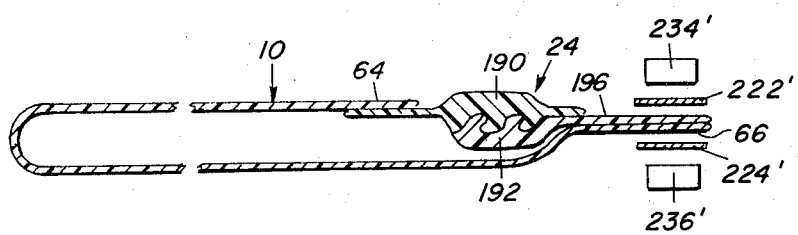
FIG. 12

3,846,209
APPARATUS FOR APPLYING CLOSURE STRIPS TO PLASTIC FILM
H. Keith Howard, P.O. Box 649 or 939, N. College, Ulysses, Kans. 67880
Filed Aug. 11, 1972, Ser. No. 279,905
Int. Cl. B31f 5/00
U.S. Cl. 156—502    25 Claims

ABSTRACT OF THE DISCLOSURE

A method of and apparatus for manufacturing stock material from which bags or other containers may be formed is disclosed. A folded plastic film is fed from a stock roll onto a plurality of carrier rollers which support the film in a horizontal position. Simultaneously, a separate closure strip is fed from a second stock roll through a guide block which aligns the strip with a sealing station, the two halves of the closure strip being pressed together to maintain proper alignment. The upper ply of the folded plastic film is fed into the heat sealing apparatus at the sealing station, the edge of the upper ply being aligned with one edge of the closure, and the film and the closure strip are fed continuously through the sealing station where they are welded together. The lower ply of the film web is folded downwardly so that it bypasses the sealing station. After the film and closure strip pass out of the sealing station, the lower ply is folded upwardly so that it coincides with the free edge of the closure strip. The film and closure strip are then fed through guide rollers and a second guide block which aligns the free edge of the closure strip and the edge of the lower ply of the film with a second sealing station, where these two edges are welded together. Thereafter, the completed stock material is fed to a take-up reel for storage or to a suitable bag forming machine.

Background of the Invention

The present invention relates to a process for continuously securing the two halves of a fastener strip to corresponding edges of a folded plastic sheet to form a stock material web from which bags and other openable and resealable containers may be formed. More particularly, the invention relates to an apparatus for aligning the fastener strip which is to be secured to the sheet with a first edge of the plastic sheet, guiding the aligned strip and sheet through a first sealing station for effecting a continuous weld, or heat seal, aligning the remaining half of the fastener strip with the second edge of the sheet, guiding the second aligned portions through a second sealing station to continuously weld the strip to the plastic sheet, and thereafter storing the completed stock material.

Plastic bags, pouches and containers of various types having interlocking pressure-sealable closures are well-known, commercially available items which are currently used for a variety of purposes. The demand for these bags is continuously growing as new uses for them are found, but also growing is the demand for a higher quality product that will reliably protect the contents of the package. Accordingly, great pressure has been placed on manufacturers of such bags to produce them in ever greater quantities while reducing the number of defects that occur in the manufacturing process, so that they are not only more reliable, but more economical to produce. Such containers may be formed in a variety of ways, with each method having its advantages and disadvantages. For example, a suitable container may be formed from tubular plastic material by heat sealing one end to close it and securing a suitable closure to the remaining end. Such closures may be, for example, conventional pressure-sealable fasteners, slide fasteners, or the like, formed from two corresponding interlocking halves. Each half of the fastener is provided with a flange by means of which it may be secured to a corresponding edge of the container opening as by means of a suitable heat sealing process.

An alternative method of making such containers is in common use, wherein a length of the fastener strip which comprises the two halves of the interlocking fastener is located between the edges of a folded web of sheet material. The assembly is intermittently fed to a sealing station where a reciprocating heating bar moves into contact with adjacent sections of the strip and web edges to weld them together. Thereafter, the resulting stock material is cut into desired lengths and the cut edges are welded closed to form the desired containers.

Such methods produce containers with openable and reclosable interlocking fastener closures that are suitable for many purposes, and containers made in this manner have proved to be commercially successful. However, as the demand for containers increases, and as the containers are put to more sophisticated uses where reliable closures are required which will, for example, permit the contents of a bag to be sealed off from the ambient air, the failings of the prior art methods become evident. One reason for such failings lies in the fact that the prior art sealing operations used in welding the fasteners to the edges of a plastic sheet are carried out by a reciprocating heat sealing bar. Such a process requires an intermittent motion of the plastic film and fastener strip, thus materially slowing down the welding operation. The material must be advanced into the sealing station and stopped, the heat sealing bar must move down, pause in contact with the edges to be welded while heat is applied and the plastic is allowed to cool. Thereafter, the bar is raised and the web and fastener strip are again advanced. This intermittent action severely limits the speed at which the stock material can be manufactured and thus limits the number of bags that a given machine can produce. An alternative mode of operation, where the heat-sealing equipment is mounted on a movable frame so that the sealing bar can move in synchronism with the motion of the web and fastener strip, has been suggested. However, such an arrangement requires the use of complex mechanical structures which would increase the cost of the machines and would decrease their reliability. It has also been found that in feeding sheet material and fastener strips into a heat-sealing machine by an intermittent feed mechanism, it is very difficult to maintain a constant tension and alignment of the fastener and the sheet. As a consequence, bags manufactured in this manner often are formed with a slight bow along the fastener edge, making the containers unsightly and often commercially unacceptable.

An additional problem in the prior art methods arises from the fact that it is very difficult to insure exact end-to-end alignment of adjacent seals formed by a reciprocating sealing bar. Accordingly, it is necessary to overlap the adjacent seals a small amount to insure that there will be no gaps in the sealed joints. However, when there is an overlap of this sort, small portions of the seal are heated and cooled twice in the process of making the stock material, and it has been found that such overlapped portions become brittle and weak. These weak sections have been found to be prone to early failure and to cause leaks in the bag closures, making containers manufactured in this manner unsuitable for reliable operation in applications where a liquid or air tight seal is required.

Finally, in the use of a reciprocating type of sealing operation, it is normal to have both edges of the fasterner sealed to corresponding edges of the film at the same time;

i.e., in a single stroke of the heating bar. Unfortunately, the plastic film from which these bags are made is often not of uniform quality, and it is not unusual to find that one edge of the film is of a different thickness than the other. The machines using reciprocating sealer bars are unable to compensate for this when both seals are made at the same time, and as a result it is often difficult to obtain seals of equal quality for both halves of the fastener. Further, films of different thicknesses will shrink different amounts under the same heating conditions, and great difficulty is encountered in adjusting the heat-sealing bars to prevent one or both sides of the sheet film material from shrinking a different amount than the fastener.

Summary of the Invention

It is, therefore, an object of the present invention to provide a method and apparatus for continuously welding a fastener strip to a plastic heat material, whereby the difficulties experienced with prior art methods, are avoided.

It is another object of the present invention to provide an apparatus for continuously welding a fastener to corresponding edges of a plastic film to provide an improved stock material from which plastic containers having openable and reclosable interlocking fastener closures may be formed.

It is another object of the present invention to provide a method and apparatus for welding a fastener strip first to one edge of a plastic film and then to the opposite edge of the film in a continuous process.

Another object of the present invention is to provide a method and apparatus for continuously securing a fastener strip to the corresponding edges of a folded web of plastic film whereby stock material from which bags may be formed is continuously and readily produced, the stock material being of a higher quality than heretofore possible.

Another object of the present invention is to provide an apparatus for continuously manufacturing a stock material from which bags may be formed, the apparatus including a mechanism for first guiding one layer of film into a sealing station in alignment with a first portion of a fastener strip and thereafter guiding a second layer of the film web into a second sealing station in alignment with a second portion of the film strip whereby the fastener strip is individually secured to the two layers of the film under controlled conditions to provide an improved stock material.

A further object of the present invention is to provide a method of manufacturing stock material from which containers may be formed wherein two plies of a plastic material are fed to a first heat sealing station where one edge of a first ply is aligned with a corresponding edge of a fastener strip. The aligned strip and ply edge are fed through the first station where the two edges are heat-welded together. Thereafter, the edge of the second ply of plastic material is brought into alignment with the remaining edge of the fastener strip and the assembly is fed through a second heat-sealing station where the last mentioned corresponding edges of the fastener strip and ply are heater-welded together.

Briefly, the present invention is directed to a method and apparatus for manufacturing stock material from which containers may be formed. The machine comprises a carriage which is adapated to rotatably support a supply roll of sheet material. Preferably, the plastic sheet is folded length-wise so that the two longitudinal edges of the two contiguous plies so formed are misaligned by about ¾ inch, the upper ply of the folded sheet, as it is fed into the machine, being shorter than the lower ply. Such a fold is known in the art as a "J-fold" and will be so identified hereinafter. The supply carriage is mounted for limited motion transversely of the direction of feed of the plastic sheet so that the edge of the sheet may be kept in alignment with the sealing stations. A pneumatic edge sensor or other suitable mechanism detects variations of the sheet from the predetermined position, and moves the supply carriage by means of a suitable hydraulic cylinder to maintain the proper alignment.

The plastic sheet is continuously fed in a generally horizontal plane over suitable guide rollers along a predetermined sealing path, passing first to the first heat-sealing station. Also supplied to the station is a plastic fastener strip formed in conventional manner to have two interlocking halves, each half being formed with a flange for use in securing the strip to corresponding upper and lower longitudinal edges of the sheet. The fastener strip is fed from a supply reel to the predetermined sealing path, passing through a guide block which aligns the flange of one half of the fastener strip with the corresponding upper edge of the plastic sheet. The aligned edges are drawn between the rotating belts of a conventional heat-sealer unit located along the path wherein the plastic material is heated to the proper temperature for welding in conventional manner, and is then cooled before the welded edges pass out of the machine. The lower ply of the film is folded down away from the first heat-sealing unit and passes outside of the heat-sealer so that it is not affected.

After the material passes through the first heat sealer unit, the lower play of the sheet is folded back up and is fed through a nip roller to a second guide block which receives the fastener strip and aligns the remaining free edge of the fastener with the longitudinal edge of the lower ply. These edges are fed to a second heat-sealer, which is a duplicate of the first unit, where the corresponding edges are welded together and cooled. Thereafter, the sheet and the attached fastener strip is fed to a power driven take-up reel, which is driven by a controlled DC motor to draw the sheet material through the assembly machine of the present invention at the desired speed and at the required tension.

The two heat-sealing units are driven in synchronism by a single variable speed motor and various rollers and supports are provided to maintain the sheet material in its proper configuration so that a smooth, wrinkle-free, continuous seal is obtained between the fastener strip and the two edges of the plastic sheet. It will be apparent that although the present system is described in terms of fastening a plastic fastener strip to a plastic sheet material, any heat-sealable materials or films such as plastic-coated paper, polyethylene, vinyl, nylon or the like can be used, the only requirement being that the temperature of the heat-sealing units be carefully adjusted to accommodate the type of material and its thickness and that the tension and speed of operation be adjusted to assure a smooth sealing operation as the material is drawn along the sealing path between the supply and take-up reels. It has been found that the present assembly machine can handle virtually any size of sheet material and can operate at a high rate of speed, with speeds of 40 feet per minute or more being easily attainable, the maximum speed depending on the characteristics of the sheet material.

The use of rotary belt type sealing units in the present machine eliminates the problems encountered with the intermittent, reciprocating type sealers of the prior art, for the belt units permit a smooth, continuous flow of material and the formation of continuous, smooth and solid heat-seals. This arrangement provides a marked improvement in the quality of the stock material produced by the assembly machine, providing a greater degree of reliability and a considerable reduction in the unusable material that was due to improper seals. Further, the present machine is considerably faster than prior art machines and thus is capable of meeting the increased demand for material of this type. The resultant stock material is a folded sheet of plastic carrying at its contiguous edges a fastener strip which allows the two edges of the sheet to be releasably secured together. This stock material may be directly fed to a bag forming machine, or may be stored on a reel for subsequent use. A suitable bag forming machine for utilizing such stock material includes means for cutting the stock material transversely and heat-sealing the resultant edges together to form a bag or container having a folded bottom, heat-sealed edges, and a closure strip at the top. A machine for accomplishing this bag forming function is disclosed in my copending application, Ser. No. 225,430, filed Feb. 11, 1972, entitled "Heat-Sealing System For Plastic Containers" and assigned to the assignee of the present application.

Brief Description of the Drawings

The foregoing and additional objects, features and advantages of the present invention will be more fully understood from a consideration of the following detailed description of a preferred embodiment of the invention, taken in conjunction with the accompanying drawings, in which:

FIG. 5 is a top plan view of a fastener guide block used in the present invention;

FIG. 6 is a side view of the guide block of FIG. 5;

FIG. 7 is a diagrammatic cross-sectional view taken along line 7—7 of FIG. 1, showing the manner in which the sheet material is fed through the first heat-sealer unit;

FIG. 8 is a side elevation of a typical nip roller assembly;

FIG. 9 is a side elevation of the check roller assembly used in the subject machine;

FIG. 10 is a top plan view of a modified form of a fastener guide block;

FIG. 11 is a side view of the guide block assembly of FIG. 10; and

FIG. 12 is a diagrammatic cross-sectional view taken along line 12—12 of FIG. 1, showing the manner in which the sheet material is fed through the second heat-sealer unit.

Description of the Preferred Embodiment

Figure 1A:
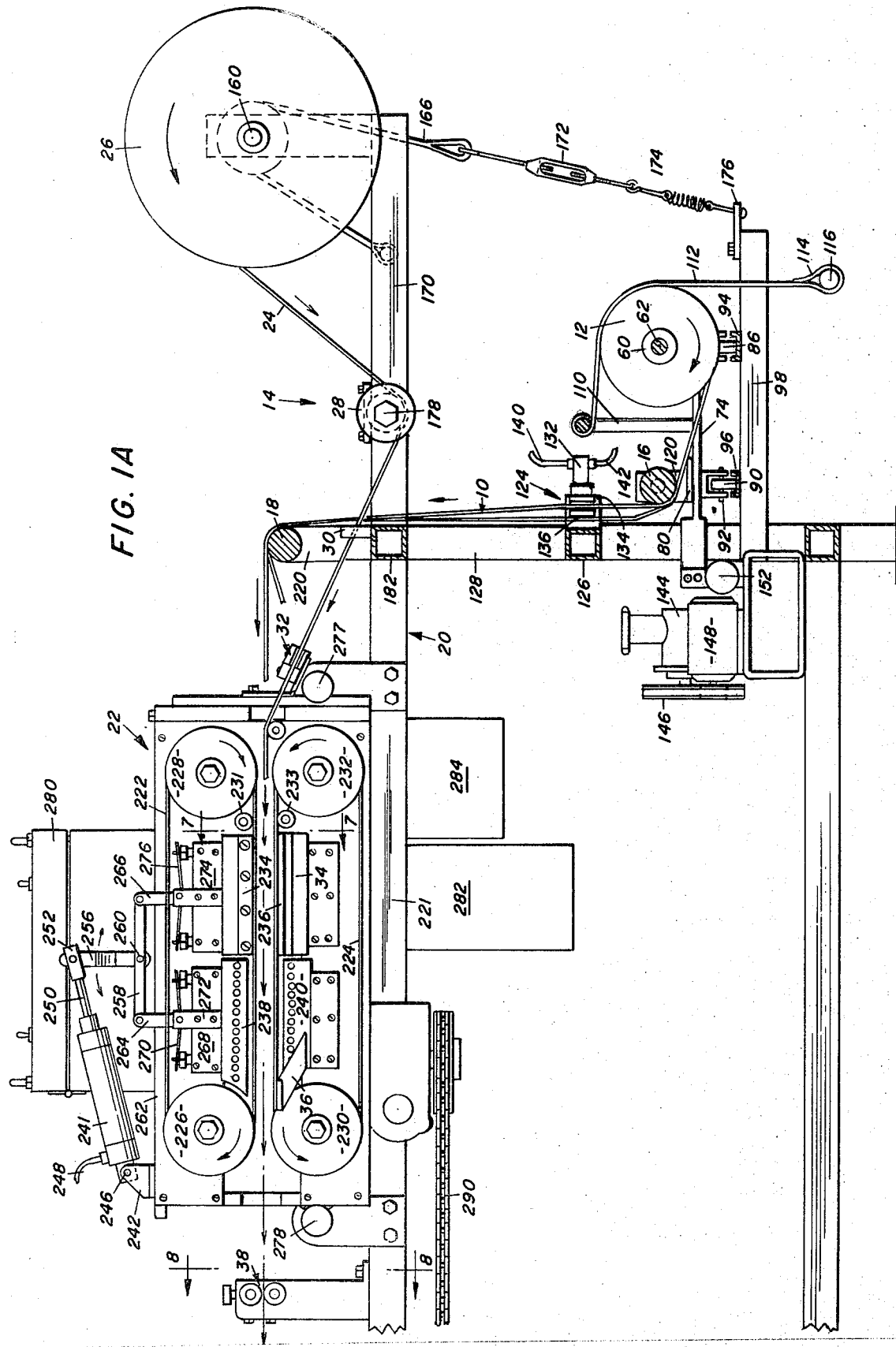
FIG. 1 is a side view in partial section of the assembly machine of the present invention, the section being taken along lines 3—3 of FIG. 2.
Figure 1B:
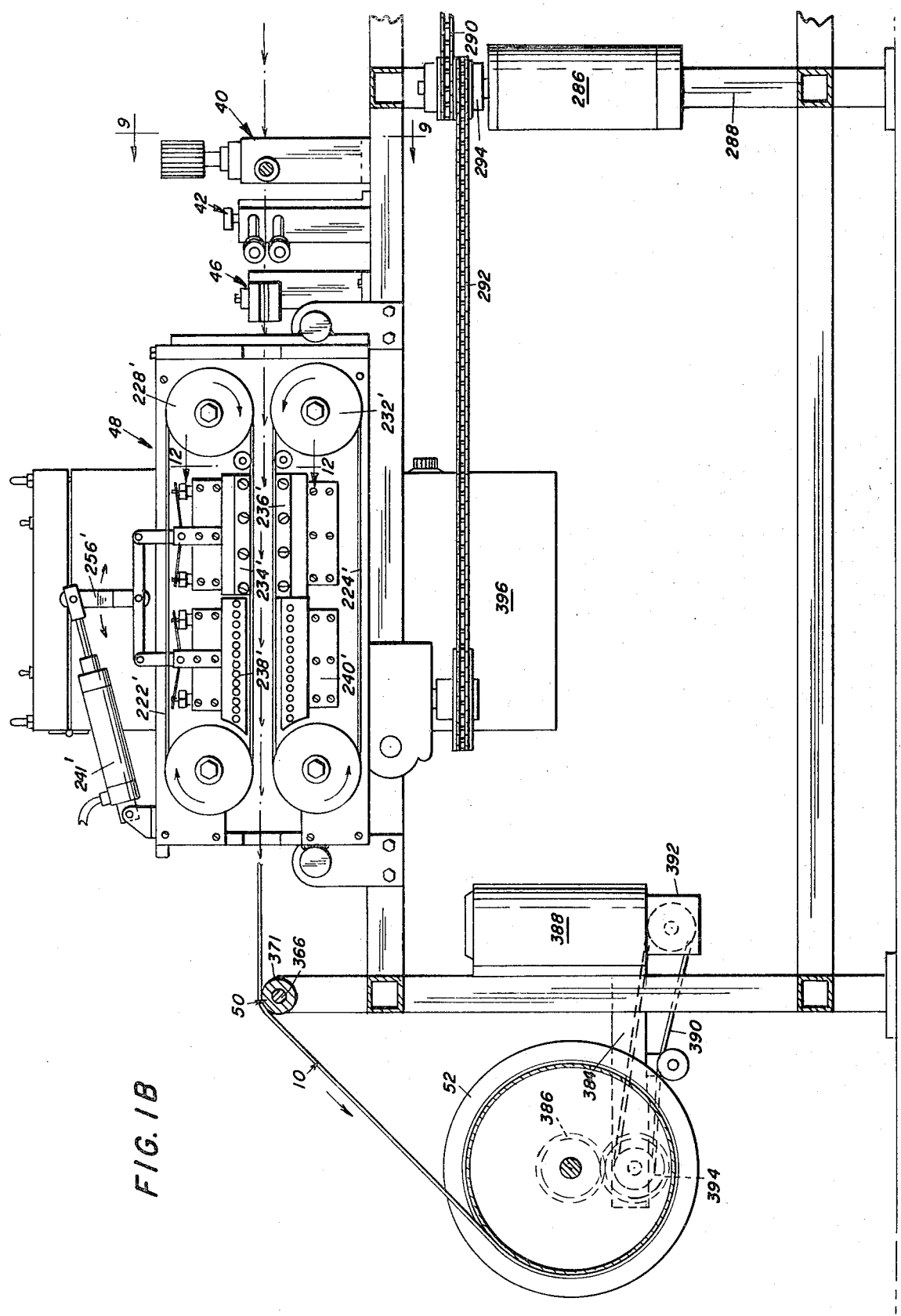

Turning now to the consideration of a preferred embodiment of the present invention, reference is made to FIG. 1 which illustrates the major elements of the present invention. The folded sheet material 10 forms upper and lower plies having longitudinal contiguous edges to which the closure strips are to be secured. Sheet 10 is fed from a supply reel 12 which is located at the right-hand end, or supply section 14, of the assembly apparatus as viewed in this figure, the sheet material passing from the supply reel around first and second guide rollers 16 and 18 which are supported on a suitable frame generally indicated at 20. This frame provides the necessary support for all of the various elements which constitute the present invention. The sheet 10 is fed to a first heat sealer unit 22 which is a slightly modified commercially available machine for sealing with heat and pressure plastic film such as polyethylene, light gauge vinyl, polyvinyl chloride, plyofilm and the like. The particular unit used with the present invention is a Doboy Model BD111 rotary band sealer, but it will be apparent that similar machines may be substituted without departing from the present invention. Machines of this type are illustrated and described, for example, in U.S. Pat. No. 2,469,972 to Lowery et al., which issued on May 10, 1949.

A strip fastener 24, the edges of which are to be secured to corresponding edges of the folded plastic film 10, is fed from a supply reel 26, through a guide reel 28 and a guide eye 30 to a guide block 32 which is shaped to snugly receive the fastener strip. The strip consists of two mating halves which may be pressed together to form a closure, and is fed by the guide block into the Doboy unit 22, where one edge of the fastener strip is heat-sealed to the corresponding edge of the upper ply of the plastic film, the lower ply of the film sheet being held away from the Doboy by means of guide plates 34 and 36 mounted on the lower portion of the Doboy machine.

After the first edge of the fastener strip has been secured to the corresponding edge of the sheet material, the edge of the lower ply of the sheet is folded up and is fed through a pair of nip rollers, generally indicated at 38, with the edge carrying the fastener strip. The upper and lower plies of plastic sheet 10 pass around a cantilevered check roller assembly 40 which extends between the upper and lower layers of the folded sheet and contacts the fold, cooperating with the nip rollers 38 and a second set of nip rollers 42 to stretch the plastic and keep it taut and smooth. The nip rollers 38 and 42 may be angled with respect to the path of the sheet as it is being drawn through the machine, thus tending to draw the sheet material toward the side of the machine on which the rollers are mounted. The check roller assembly 40, which includes a horizontal free-wheeling disc 44 (see FIG. 2), opposes this tendency of the nip rollers. The assembly 40 is adjustable in length to accommodate any desired width of folded sheet material, and cooperates with the nip rollers to maintain the free edges of the sheet in general alignment to assure a smooth, even motion of the material through the assembly machine.

After passing through the second set of nip rollers 42, the fastener strip is fed through a second guide block 46 which aligns the strip with a second Doboy machine 48. The lower edge of the sheet is fed into the second Doboy in alignment with the remaining free edge of the closure strip where it is heat-sealed to that edge. The sheet material carrying the fastener strip is then fed across a final guide roller 50 and is drawn onto a suitable storage reel 52.

Turning now to a more detailed consideration of the continuous sealer assembly of the present invention, reference will first be made to the supply section 14 illustrated in FIS. 1 and 2, and shown in more detail in the perspective view of FIG. 3. As has been explained, the web 10 is supplied to the machine of the present invention from a suitable source such as supply roll 12, the web being wound on a core 60 which is in turn supported by an axial shaft 62. The supply roll 12 carries a length of sheet material which has been folded in half so that the longitudinal edges 64 and 66 of the contiguous upper and lower plies are approximately aligned, the edges preferably being offset by about ¾ of an inch in the "J-fold" configuration with the lower ply extending beyond the upper ply. The folded sheet material may be formed from a wide film of material which is folded longitudinally and wound on the core 60 or may be formed from tubular stock material which has been cut lengthwise and wound on the roll.

Supply roll 12 is supported for rotation on a pair of bearing blocks 70 and 72 which are, in turn, mounted on the side rails 74 and 76 of a reciprocable supply roll carriage 78. As best illustrated in FIG. 3, supply carriage 78 is mounted on roller bearings or sheets for reciprocating motion transversely of the assembly machine and parallel to the axis of the supply roll 12 to permit proper alignment of the edges of sheet 10 with the closure strip and with the sealing units of the machine. In addition to side rails 74 and 76, the supply roll carriage 78 includes a crossbar 80 extending between corresponding ends of the side rails. The remaining ends of the two side rails are spanned by the supply roll 12.

Figure 2A:
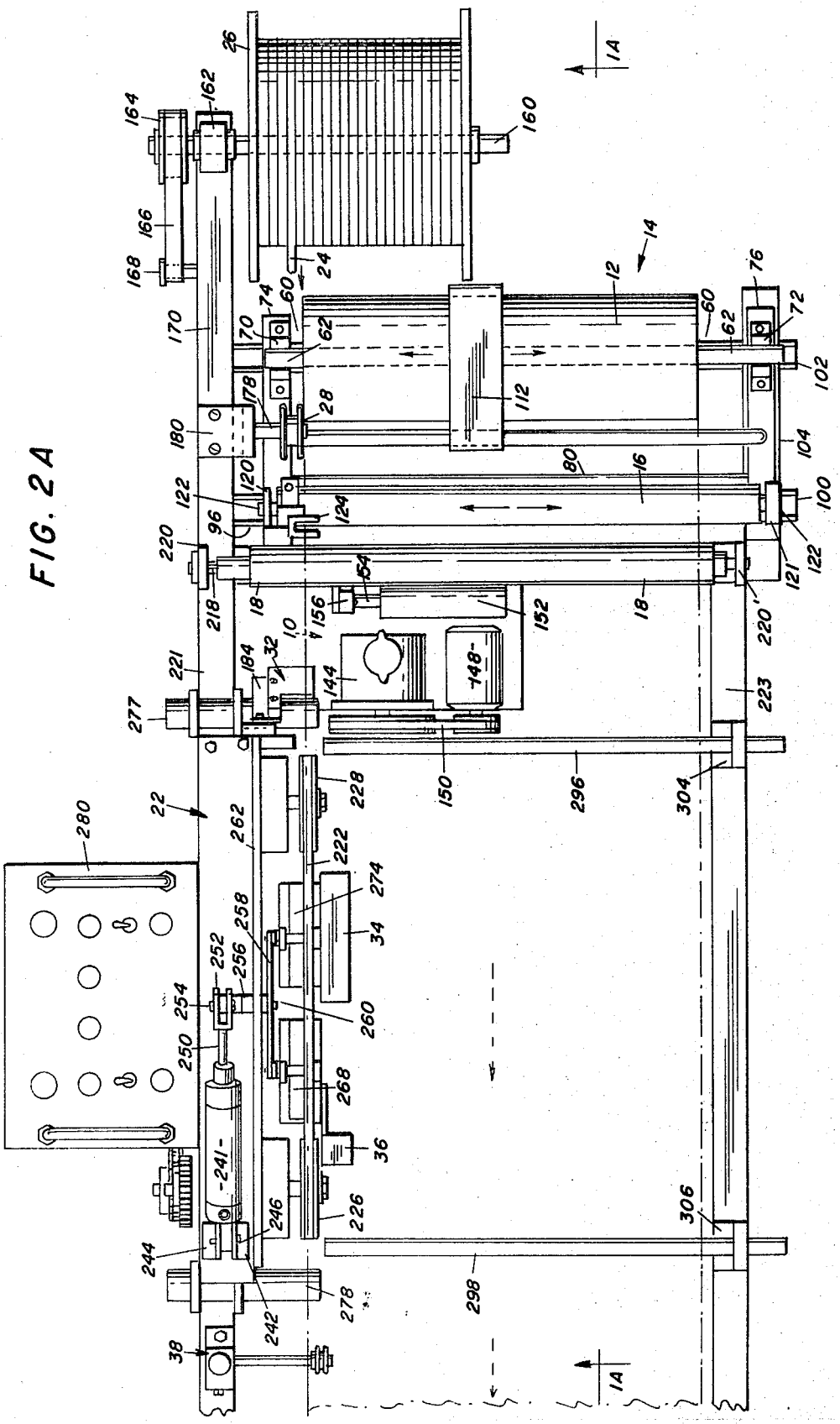
FIG. 2 is a top view of the assembly machine of FIG. 1.
Figure 3:
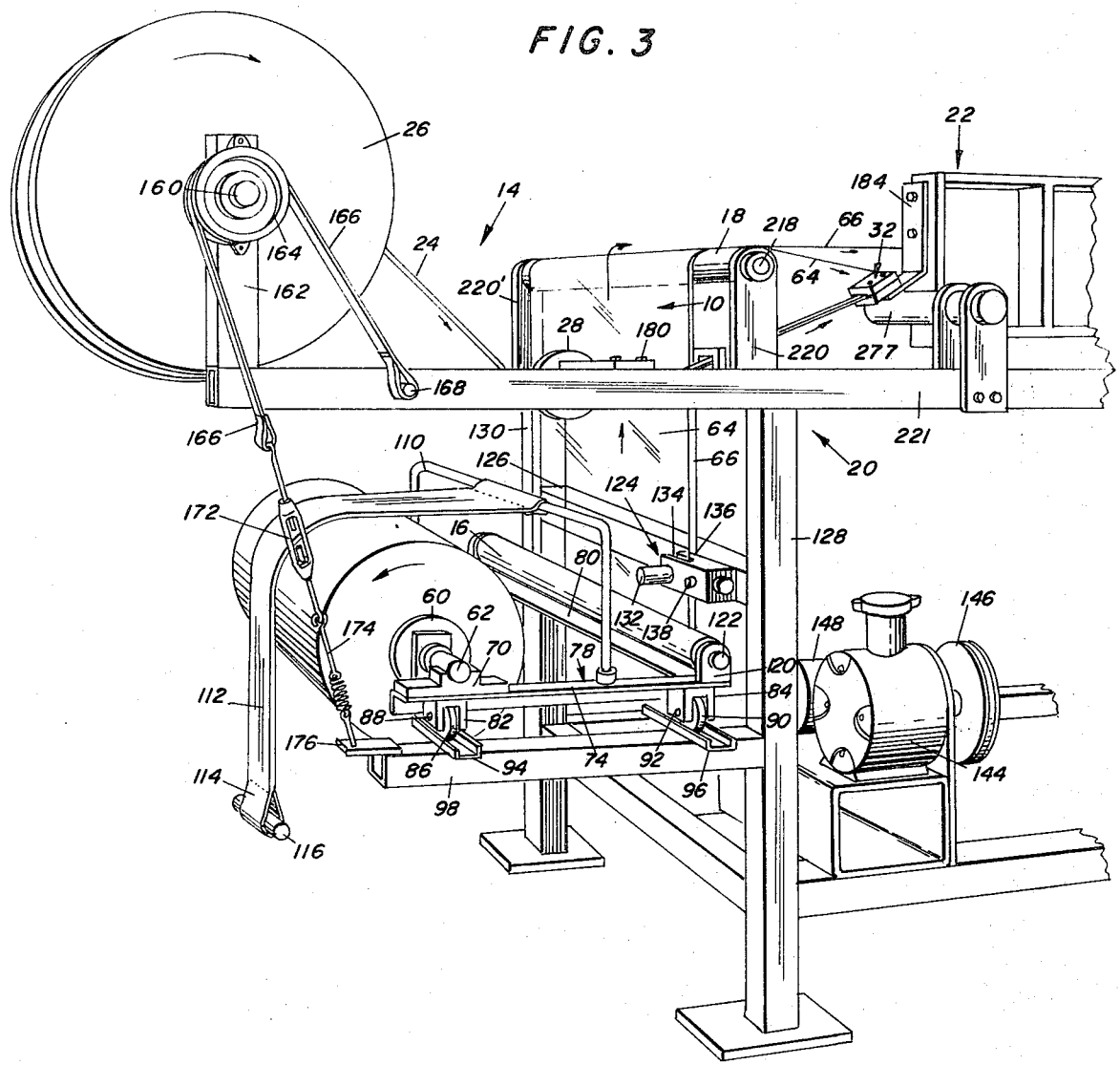
FIG. 3 is a partial perspective view of the material supply portion of the assembly machine, taken from the rear of the machine as it is viewed in FIG. 1.

On the underside of each of the side rails 74 and 76, which may be formed, for example, from angle iron having an L-shaped cross-section, are secured a pair of wheel or bearing housings as illustrated on rail 74 at 82 and 84 in FIG. 3. In the present embodiment, housing 82 carries a wheel 86 which is rotatably mounted on a pin 88; similarly, housing 84 carries a wheel 90 rotatably mounted on a pin 92. Wheels 86 and 90 extend below their respective housings and are adapted to roll in corresponding tracks 94 and 96 which are secured to and extend transversely across a cantilever arm 98 which forms a part of the machine frame 20. The side rail 76 carries wheel housings (not shown) similar to those secured to side rail 74, with the corresponding wheels being adapted to run in corresponding tracks 100 and 102 (FIG. 2) mounted transversely across a support arm 104 which also forms a part of frame 20.

A generally U-shaped hanger bar 110 is secured between the side rails 74 and 76 and is adapted to hold a tension control belt 112. This belt, which may be made of canvas or like material, has one end secured to the hanger bar while the other end is formed in a loop 114 which is adapted to receive a weight 116. The surface of belt 112 rests on the surface of supply roll 12, with the weight 116 determining the amount of pressure exerted by the belt on the outer surface of the roll, and thereby retards the rotation of roll 12 by a selected amount. This pressure determines the tension of the sheet 10 as it is withdrawn from the roll and fed into the assembly portion of the machine and through the heat-sealing units.

The first guide roller 16 is rotatably mounted on suitable brackets such as brackets 120, 121, carried by the side rails 74 and 76. The roller 16 is rotatably supported by a shaft 122 journalled in the brackets and since it is mounted on rails 74, 76, it moves with the supply roll carriage 78 laterally of the frame 20. The sheet 10 passes under the roller 16 (see FIG. 1) and is fed upwardly past a sensor 124 which detects the location of edge 64 of the upper ply of the sheet material.

Sensor 124 is mounted on a cross beam 126 (FIG. 3) on frame 20, the cross beam extending between two vertical support legs 128 and 130. The sensor consists of an air valve 132 which is sensitive to the flow of an air jet through an aperture defined in a pair of closely spaced aperture blocks 134 and 136. The air jet is directed through the aperture, and the edge 64 of sheet 10 is positioned between the two aperture blocks so that the location of the sheet affects the air flow. When the sheet tends to move out from between the two aperture blocks, the air jet can flow through the apertures to shift the air-actuated valve 132 in a first direction. When the sheet moves further between the aperture blocks, it will reach a position where it cuts off the air flow, thus causing the air-actuated valve to shift in the opposite direction. To provide the required air flow, pressurized air is fed to an inlet 138 by means of a hose or the like (not shown) from a suitable source of compressed air. Inlet and outlet lines 140 and 142 (FIG. 1) are connected to the air-actuated valve 132 from a source of hydraulic pressure supplied, for example, by a pump 144. This pump may be driven by means of a pulley 146 from an electric motor 148 and a suitable belt drive 150. The position of valve 132 is sensed by the flow of hydraulic fluid in line 142 which, in turn, controls by means of suitable valves, a hydraulic cylinder 152 having a reciprocating piston connected by means of a shaft 154 (FIG. 2) to a bracket 156. This bracket is secured to the cross-bar 80 of the supply carriage 78 whereby actuation of the hydraulic cylinder will move the carriage in one direction or the other on its tracks 94, 96, 100 and 102.

The sensor 124 operates to continuously shift the carriage in a reciprocatory motion about the predetermined location of the sensor air flow aperture. When air flows past the edge of the sheet and actuates the control valve 132, the piston of hydraulic cylinder 152 shifts the carriage 78 in a direction to cause sheet 10 to cut off the air flow. As soon as the air flow stops, the valve 132 again shifts, causing the piston of the hydraulic cylinder 152 to move in the opposite direction, shifting the carriage 78 and drawing the sheet away from the air flow, and the cycle repeats. This operation produces a continuous "hunting" action at the edge 64 of sheet 10, causing a continuous, but limited, transverse adjustment of the supply roll and its carriage so that the plastic sheet is fed on a constant line to the sealing station 22 even if it has been unevenly wound on the supply roll. By providing a hydraulic cylinder having a stroke of 4 inches, the plastic can be placed on roll 12 as much as 2 inches off center and still be brought into proper alignment for use with the assembly machine of the present invention.

The supply reel 26 which carries the fastener strip 24 is supported by means of a shaft 160 journalled in a frame member 162. The reel carries a long length of the fastener strip and pays it out as required by the heat-sealing machine 22. To maintain the appropriate tension on the fastener strip, shaft 160 is provided with a pulley 164 around which is stretched a length of a V-belt 166. Belt 166 is connected at one end to a stud, bolt or the like 168 secured to a convenient frame member such as horizontal beam 170 which forms a part of frame 20, and which supports frame member 162. Belt 166 is connected at the other end to a turnbuckle or other adjustable connector 172, which is in turn connected by a rod and/or cable and expansion spring 174 to a bracket 176 on the frame element 98. By tightening or loosening the turnbuckle 172, the tension on belt 166 can be adjusted and the drag applied to pulley 164 varied to produce the desired tension in the strip 24.

Guide pulley 28, around which the fastener strip 24 passes for alignment with the sealing station 22, is carried on a shaft 178 that is secured to horizontal frame member 170 by means of a bracket such as that illustrated at 180. After strip 24 passes around pulley 28, it is fed through the guide eye 30 which is secured to frame member 182 extending between the vertical legs 128 and 130. The strip is then fed through the guide block 32 which is secured to the side of the heat-sealer unit 22 by means of a bracket 184 which positions the guide block at the proper angle and location to feed the strip into the Doboy heat-sealer.

Figure 4:
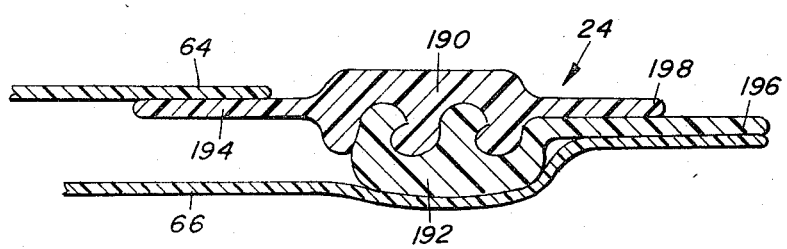
FIG. 4 is a partial cross-sectional view of the stock material assembled from the sheet and fastener strip supplied to the present machine.

As will be seen in FIG. 4, the fastener 24 is shown in cross-section as comprising upper and lower interlocking halves 190 and 192, the upper half having a first flange 194 which is adapted to be heat-welded to the edge 64 of the upper ply of sheet 10, while the other half is formed with a second flange 196 which extends in the opposite direction from the first flange and is adapted to be heat-welded to the edge 66 of the lower ply of sheet 10. The upper half of the fastener also includes a tab 198 while lies adjacent flange 196 when the fastener is closed but may be gripped and used to pull the upper half of the fastener away from the lower half when it is desired to separate them. This tab may be used, for example, for opening the bags which are formed from the stock material manufactured by the present machine. Although a specific shape for the interlocking ridges and grooves on the upper and lower halves 190 and 192 has been shown, it will be understood that numerous variations are known in the art and that the illustration is merely exemplary of the type of fastener that may be used.

As illustrated in FIGS. 5 and 6, guide block 32 consists of upper and lower generally L-shaped sections 202 and 204 secured together by means of suitable screws, bolts or the like indicated at 206 and 208. It will be noted that the bolts 206 and 208 pass through and secured block 32 to the support bracket 184 which is shown in part in FIGS. 5 and 6 and in greater detail in FIGS. 1 and 3. As illustrated in FIG. 6, the upper section 202 has its inner surface milled or otherwise shaped as at 210, while the lower section is similarly shaped at 212, the two milled surfaces cooperating to form a shaped groove 214 which is adapted to receive the fastener strip 24. As illustrated, the groove 214 is provided with an enlarged portion 216 which is adapted to receive the interlocking portion 190, 192 of the fastener, which is thicker than the two plies of sheet 10, while the remainder of the groove is of sufficient depth to receive the flange portions 194 and 196 and the tab 198. The enlarged portion 216 is centered in the block and serves accurately to guide the fastener strip as the strip is pulled through the groove and fed into Doboy sealer unit 22. In order to reduce the friction between strip 24 and the guide block, it is preferred that the inner surfaces of the groove 214 be coated with a low-fraction material such as Teflon.

Before being fed to the heat-sealer 22, the sheet 10 passes over the guider roller 18, which is supported by means of a shaft 218 on brackets 220 and 222. These brackets are secured on the side rails 221 and 223, respectively, of the frame 20 so that the roller extends transversely across the frame, perpendicular to the direction of movement of sheet 10. The roller is preferably covered with cork to provide a frictional contact between the surface of the roller and the film, thereby insuring a better distribution of the tension on the film created by the pull of the sealer units 22 and 48 and the wind-up reel 52, and thus assuring a smooth feed of sheet 10 into the heat sealers. Roller 18 guides the sheet into a generally horizontal plane, and means (to be described) are provided to maintain the sheet in that plane as it passes through the assembly machine.

Referring now to FIGS. 1 and 2, it will be seen that the Doboy heat sealing unit 22 is of the rotary band type, having upper and lower stainless steel bands 222 and 224. The upper band 222 is supported and driven by first and second spaced pulleys 226 and 228, while the lower band is mounted on and driven by first and second spaced pulleys 230 and 232. The direction of rotation of the pulleys is such that the lower run of band 222 and the adjacent upper run of band 224 move in the same direction with respect to the machine. These adjacent runs of the two bands are located sufficiently close together to grip the edge of the film 10 and a corresponding flange of the fastener strip 24 as they are fed into the unit and to carry them through the heat-sealer at the appropriate speed for proper heat-welding of the flange to the edge of the sheet. Nip rollers 231 and 233 may be provided adjacent the bands to assist in drawing the material into the sealer unit. The actual heat-sealing is accomplished by a pair of heating bars, an upper bar 234 and a lower bar 236, which are maintained at the proper temperature to soften the plastic material sufficiently to effect a complete weld of fastener flange to the edge of the sheet material. It will be apparent that the appropriate temperature will vary with the type of material used, its thickness, and the speed with which the sheet is drawn through the heating station. The heating bar is held away from contact with the plastic material by the steel band so that the melted plastic will not tend to stick to the bars, and the bands may be coated with Teflon or a like non-stick coating to insure that the plastic does not stick to the band. After the plastic sheet passes out of the heating zone defined by heating bars 234 and 236, it is carried into a cooling zone which consists of upper and lower cooling bars 238 and 240. The cooling bars provide a flow of air onto the plastic and onto the bands which are in contact with the molten areas, cooling and solidifying the plastic to provide a permanent connection between the flange of the fastener and the corresponding edge of the sheet material.

In order to accommodate the Doboy machine to the present use, it was found necessary to modify the commercially available machine to provide an automatic lifting mechanism for the heating and cooling blocks 234 and 238 so that if the operation of the assembly machine is stopped for a short period of time, the heating and cooling bars will be lifted away from contact with the steel bands, thereby preventing overheating and resultant excessive damage to the plastic material located between the bands. Automatic lifting of the bars is accomplished by means of a pneumatic cylinder 241 which is pivotally mounted to the upper surface of the heat sealer machine by means of a pair of brackets 242 and 244 and a pin 246. The cylinder carries a piston which is movable by air applied by way of pneumatic inlet line 248 to drive a shaft 250.

The free end of piston rod 250 is connected by means of a U-shaped bracket 252 and a pin 254 to the upper end of a pivotally mounted lever arm 256. This arm is connected to the center of a generally horizontal lifter bracket 258 by means of a pin connection 260, the lever arm extending below bracket 258 and resting on the upper surface 262 of the housing for the heat sealer. Fastened to the outer ends of lifter bracket 258 are two downwardly-extending arms 264 and 266, the lower ends of which are fastened to the cooling bar mechanism 238 and the heating bar mechanism 234, respectively. The cooling bar is movable with respect to housing 268 and is biased downwardly by means of a leaf spring 270 held at its center point by a bracket 272 secured to the housing. The outer ends of the leaf spring are connected by means of suitable rods or the like to urge the cooling mechanism downwardly. In similar manner, the heating bar 234 is connected for movement with respect to its housing 274, with a leaf spring 276 biasing the heating bar downwardly.

Sealer unit 22 is firmly secured to the machine frame 20, in particular on the side rail 221, by any suitable means. For example, a pair of support arms 277 and 278 may be welded or otherwise fastened to the ends of the Doboy machine, and the arms in turn supported by suitable brackets on the side rail. These brackets may be adjustable to permit alignment of all the components of the assembly machine, but preferably will be fixed in position once it is properly located.

When the heat sealing machine is operating and the rotary belts are drawing the sheet and fastener strip through the heating and cooling bars, the piston rod 250 is in its retracted position, allowing the bars 234 and 238 to move down against the belts. This causes the belts to grip the material and carry it at a constant speed through the unit to obtain the desired continuous sealing operation. If the sealer is stopped for any reason, the piston rod moves to its extended position (illustrated) and moves the lever arm 256 to an approximately vertical position. This causes the lower end of the lever arm to press downwardly on the upper surface 262 of the sealer unit, whereby the lower end acts as a pivot to raise the lifter bracket 258 and thus lift the heater and cooling bars upwardly away from the steel band 222, against the bias of leaf springs 270 and 276. This allows the machine to be stopped without burning the plastic material and thus prevents damage and resultant wastage of material. The necessary controls for regulating the temperature of the heating bar and the rate of the air flow of cooling bar are contained in a control box 280 which forms a part of the Doboy machine. Similarly, the drive motor control for the pulleys and the power supply are enclosed in housings indicated diagrammatically at 282 and 284 in FIG. 1. The motor control circuitry 282 regulates the speed of an electric drive motor 286 which is mounted on a vertical support leg 288 of the machine frame and which provides driving power to the heat sealer 22 by means of drive chain 290 and similarly provides synchronized drive power to heat sealer 48 by means of drive chain 292. Both drive chains are driven by a drive sprocket 294 connected to the motor shaft. Regulation of the speed of motor 286 controls the speed of the rotary band pulleys on the heat sealer 22 and corresponding pulleys on sealer 48, thus regulates the speed of travel of the plastic sheet 10.

As previously noted, a pair of guide plates 34 and 36 are mounted on the front of heat sealer 22 to prevent the lower ply of the sheet from entering sealer unit 22. Thus, as is diagrammatically illustrated in FIG. 7 which represents a partial cross-sectional view of the heat sealer 22 taken on lines 7—7, only the edge 64 of the upper ply of the folded sheet 10 passes between the rotary belts 222 and 224 in alignment with and in contact with the flange 194 of the upper half of the fastener strip 24. The interlocking fastener halves 190 and 192 pass behind the bands, pulleys and heater bars of the heat sealer, and thus are not affected by the heat. Although the figure illustrates the band as being spaced from the plastic sheet and fastener strip, it will be understood that this is for clarity of illustration and that the bands actually firmly contact the plastic material and draw it through the heat sealer machine. The edge of the lower ply of the sheet 10 is folded down out of its horizontal plane and away from the heat sealer, being held out of contact from the heating equipment by the guide plate 34. It will be understood that care must be taken in folding this edge down, for in doing so the tension on the bottom ply is changed with respect to that on the upper ply, and this can result in an improper feed of the sheet material through the assembly machine. Also, it will be noted from the FIG. 7 illustration that the upper edge 64 is fed into the heat sealer above the flange 194 so that the fastener strip is secured to the under surface of this ply.

To make sure that the sheet 10 remains horizontal so that it will move through the assembly machine smoothly, a plurality of support rods 296, 298 and 300 are mounted on the horizontal longitudinal rail 223 which forms a part of the machine frame. These rods are adjustably supported by means of brackets 304, 306 and 308, respectively, the brackets being mounted on the rail for pivotal adjustment and the rods being mounted in the brackets for axial adjustments so that they will extend generally transversely across the machine an adjustable distance and so that their angle with respect to the direction of movement of the sheet material can be adjusted to provide maximum support for the sheet.

The transverse support rod 298 is located near the exit end of the heat sealer 22 and extends to a point close to the edge of the sheet material, thereby serving to lift the edge 66 of the lower ply back to its horizontal position after the lower ply passes beyond guide plate 36. The lower ply is then fed between a pair of nip rollers indicated generally at 38 and shown in detail in FIG. 8, to which reference is now made. The nip roller assembly 38 comprises an upper support shaft 310 pivotally mounted at one end, as by means of a mounting pin 312, in a housing 314 and carrying at its free end a freely rotatable sleeve 316. This sleeve is mounted on bearings or may itself constitute a bearing at its contact surface with the support shaft. Sleeve 316 is provided with a friction surface which will grip the smooth plastic sheet 10, and for this purpose a pair of rubber O-rings 317 and 318 may be used, the rings being cemented in place on the sleeve. An adjusting screw 320 is threaded into housing 314 to contact the upper surface of the support shaft and limit its upward motion.

The assembly 38 further consists of a lower support shaft 322 which is fixedly mounted in housing 314 and which also carries a rotatable sleeve 324 at its outer end. Sleeve 324 is provided with a friction surface to grip the lower surface of sheet 10, and for this purpose may be provided with rubber O-rings 326 and 328. The housing 314 is fixed to a mounting bracket 330 by means of a bolt 332 which passes through and secures the nip roll assembly to the side rail 221 of the machine frame. A single bolt is used to secure the bracket so that the nip roll assembly is pivotally mounted to the side rail whereby the angle of the support shafts 310 and 322 with respect to the path of travel of sheet 10 may be varied. As illustrated in FIG. 8, the lower ply of sheet 10 passes between the nip rollers and the upper roller is pressed downwardly by the adjusting screw 320 to assure a firm grip on the sheet. The resiliency of the O-rings accommodates the assembly to varying thicknesses of the sheet material, while the friction surfaces, when set at a slight angle to the path of motion of the sheet, tend to draw the sheet into the rollers and toward the housing 314. Preferably, these rollers are set at a very slight angle with the path of the sheet, and thus assist in maintaining the sheet material in line with the steel bands of sealer 22.

After sheet 10 passes through the nip roller assembly 38, the upper ply passes over and the lower ply passes under the check roller assembly 40, the disc 44 of which contacts the fold of the plastic sheet, holding it away from the sealing machines and assuring that the fold follows a straight line path between the supply reel 12 and the take up reel 52. The check roller assembly cooperates with the nip roller assembly 38 and nip roller assembly 42, which is similar to assembly 38, to maintain the film taut and smooth across its width. The check roller is illustrated in detail in FIG. 9, wherein it is seen to comprise an elongated shaft 334 supporting the check disc 44 at its outer, or free, end. As shown disc 44 is rotatably mounted on support arm 334 by means of a vertical shaft 336 on which the disc is journalled by suitable bearings. Support arm 334 passes through a bore in the check roller housing 336 and is supported thereby in cantilevered fashion. The shaft may be keyed in the bore to prevent rotation and to insure that disc 44 will remain horizontal. A row of gear teeth 340 is formed along the shaft 334, the teeth being adapted to engage a spur gear (not shown) within the housing 336. This spur gear is mounted on a vertical shaft 342, which extends out of the top of housing 336 and carries on its outer end a knurled handle or knob 344 by means of which the spur gear can be rotated. It will be apparent that rotation of knob 344 rotates the spur gear and causes shaft 334 to be drawn through the bore in housing 336. Thus, the effective length of shaft 334 and the distance that the check roller extends across the width of the assembly machine may easily be adjusted to provide the desired degree of tautness in the sheet 10.

As has been mentioned, the nip roller assembly 42 is similar to the assembly 38, and need not be further explained, except to note that it is pivotally mounted on the side rail and it is arranged at an angle sufficient to draw the sheet and the fastener strip tightly and smoothly toward the second guide block 46.

The second guide block assembly 46 is similar to guide block assembly 32 in that it comprises an upper and lower shaped block, indicated at 346 and 348, respectively, in FIGS. 10 and 11. As shown in the side view of the assembly in FIG. 11, the blocks are shaped to receive the two edges of the folded sheet 10 and the fastener strip 24 within a groove 350 formed between the blocks. The depth of this groove may be varied since the upper block 346 is pivotally mounted by means of a support arm 352, this arm being connected as by a pin 354 to a guide block assembly housing 356. The upward motion of arm 352 is limited by means of an adjustable screw 358 which is threaded into housing 356 and engages the upper surface of arm 352. The lower block 348 is mounted on support arm 360 which is fixedly secured in housing 356. The housing is secured to the side rail of the machine frame as by means of bolts 362 and 364, or by other suitable means.

The guide block assembly is carefully aligned with the rotary bands of the second heat-sealing unit 48, whereby the lower edge of the sheet 10 will be fed between the upper and lower bands. The upper arm of the guide block assembly 46 is adjusted to accommodate the thickness of the sheet and strip material and to produce the required pressure and tension on it to insure a smooth flow of the material through the sealer. Sealer unit 48 being identical to sealer 22, the various elements are similarly numbered, with the numbers on the second unit being primed to distinguish the two. It will be noted that the guide plates 34 and 36 which appear on unit 22 are not required for unit 48 since the lower ply of the sheet is being fed through the heat-sealing bands.

The manner in which the second sealing operation is accomplished in unit 48 is diagrammatically illustrated in FIG. 12, which is a cross-sectional view of a portion of the heat sealer 48 taken on line 12—12 of FIG. 1. It will be seen that in this portion of the assembly machine, it is the flange 196 of the lower half 192 of the fastener strip that is being secured to edge 66 of the lower ply of sheet 10. These two elements are aligned with the upper and lower bands 222' and 224' of sealer 48 and are welded together by heating bars 234' and 236'. The fastener halves 190 and 192 are forward of the rotary band pulleys 226', 228', and 230' and 232', as viewed in FIG. 1, so that the heat will not affect the operation of the interlocking fastener. After the lower edge 66 and the flange 196 pass through the heating elements 234' and 236' and through coolers 238' and 240', the manufacture of the stock material is complete and appears in cross-section as illustrated in FIG. 12. This stock material, which consists of the sheet 10 and the fastener strip 24 secured together as illustrated, may then be used to manufacture containers in the manner described in my aforementioned copending application.

The completed stock material is fed across the final horizontal guide roller 50 which is rotatably mounted by means of a shaft 366 journalled in end brackets 368 and 370 secured to the longitudinal side rails 221, 223 of the assembly machine frame. The surface of this roller is covered by a cork tape 371 to provide a frictional contact with the stock material so that the tension will remain constant across the width of the sheet. The roller must be carefully aligned so that the sheet is drawn evenly across it and does not wrinkle. As may be seen in FIG. 2, the cork surface of roller 50 is reduced in thickness at 372 as by removing a section of tape 371 to accommodate the extra thickness of the fastener strip as the stock material is drawn across the roller. This allows the material to be maintained in its horizontal plane as it is drawn across the roller and fed to the take-up reel 52. In addition, the covering at the end portion 374 of the roller is of less thickness than the covering 371, again to accommodate the configuration of the fastener strip.

The take-up reel 52 is carried on a support shaft 376 which is journalled at each end in suitable bearing blocks 378 and 380 which are, in turn, supported on frame arms 382 and 384. The support shaft 376 carries the drive gear 386 by means of which the reel is rotated in such a manner as to drawn sheet 10 through the assembly machine at a constant speed and at a constant tension. The drive mechanism for gear 386 includes an electric motor 388 driving a chain 390 through a reduction gear 392. Chain 390 in turn drives a spur gear 394 mounted on a shaft (not shown) which carries a second spur gear that engages drive gear 386 to rotate the reel 50.

A conventional D.C. motor control unit 396, such as that manufactured by the Minarik Electric Company, Los Angeles, Calif., is secured to the frame 20 and permits an accurate setting of the speed at which reel 52 is to be operated. This motor control unit keeps the speed and tension of the sheet at a constant level by gradually increasing the motor torque as the speed decreases, this decrease in speed occurring as the diameter of the roll of stock material on reel 52 increases.

A number of controls are provided for the assembly machine to permit separate components of it to be operated independently if desired. Such control arrangements permit, for example, the take-up reel 52 and the edge sensor mechanism to be operated without turning on the Doboy units. This allows the sheet 10 to be wound off of a supply roll and rewound onto a second reel in the event that the original roll is so unevenly wound that it cannot be used in the machine. By operating the edge control system in this manner, a more acceptable supply roll can be obtained, having edges that are more closely aligned, and with the sheet being wound with proper tension. This versatility of the present machine is a great asset in the manufacture of the stock material from rolls of flat or folded sheet material.

Although not illustrated in the drawings, it is contemplated that additional nip roller assemblies may be provided along the path of sheet 10 in order to provide additional control of the material, if desired. Such additional rollers may be adjacent the Doboy machines, or may be placed on the opposite side of the sheet path and assist the check roller in guiding the folded edge of the sheet along the length of the apparatus. Further, a second check roller assembly may be mounted on the machine between the sealer unit 48 and guide roller 50. This check roller is inserted between the plies by opening the fastener and serves to eliminate wrinkles in the sheet so that the stock material is wound smoothly onto the take-up reel. A set of Teflon-coated guide blocks with milled grooves then recloses the fastener before the sheet passes over roller 50.

It has been found in operating a machine constructed in accordance with the present invention that in order to obtain a smooth and rapid, high quality assembly operation, it is necessary carefully to adjust the tension on the supply reels of the fastener strip 24 and sheet material 10 so that the tension will be about equal as both components are fed into the first Doboy heat sealer unit. Equal tensions are needed to make sure that the fastener strip does not stretch more or less than the sheet material 10 when it is heated during the heat welding operation, for if there is too great a difference in these tensions, the resulting seam will be buckled and uneven. Within the Doboy units themselves, the temperature of the upper and lower heating bars and cooling bars must be adjusted to compensate for differences in thicknesses of the film 10 and the flanges of the fastener strip, and these temperatures must be monitored to make sure that variations in thickness along the length of the material does not cause faulty sealing. In the first heating unit 22, it is necessary to protect the back of the heating bar (the right-hand side as viewed in FIG. 7) so that the fastener strip does not drop down during the heating operation and come into contact with the back of bar 236.

The various nip roll angles and tensions normally can be adjusted for a given manufacturing run, and then left alone; however, the check roller must be carefully monitored and adjusted to compensate for normal variations in sheet stock material size. The tension on the sheet exerted by the wind-up reel 62 may require occasional adjustment during a run in order to keep the film smooth and wrinkle free. It will be noted that the final guide roller 50 serves to flatten out the stock material and remove air from between the plies prior to its being rolled up on the take-up reel.

Although the present invention has been described in conjunction with a specific embodiment thereof, it will be understood that numerous variations and modifications can be made without departing from the true spirit and scope of the invention as set forth in the following claims.

What is claimed is:

1. In an apparatus for continuously sealing the longitudinal edges of a strip of heat-weldable material to the corresponding longitudinal edges of two contiguous plies of heat-weldable material as said strip and said plies are drawn continuously along a sealing path;
   a first heat sealing station located along said path;
   means for supplying said two contiguous plies of material to said first heat sealing station;
   means for supplying said strip to said first heat sealing station;
   means for aligning a first edge of said strip with said first heat sealing station;
   means for aligning the edge of only one of said plies with said first heat sealing station;
   means for continuously feeding said strip and said one of said plies through said first heat sealing station;
   means for guiding the other of said plies away from said one of said plies to bypass said first heat sealing station;

a second heat sealing station loacted along said path and spaced from said first heat sealing station;

means for guiding said two plies and said strip along said sealing path from said first heat sealing station to said second heat sealing station;

means for aligning the second edge of said strip with said second heat sealing station;

means for aligning the edge of the other of said plies with said second heat sealing station; and means for continuously feeding said strip and said other of said plies through said second heat sealing station, whereby said strip and said plies are continuously drawn along said path first through said first heat sealing station and subsequently through said second heat sealing station for sealing said strip first to said one of said plies and subsequently to said other of said plies.

2. The apparatus of claim 1 wherein said means for aligning the first edge of said strip comprises a guide block having a shaped groove adapted to receive said strip, said guide block being aligned with said first heat sealing station.

3. The apparatus of claim 1, wherein said means for aligning the edge of said one of said plies with said first heat sealing station comprises means for sensing deviations of said edge from a predetermined location and moving said one of said plies to reduce said deviation.

4. The apparatus of claim 3, wherein said means for aligning the first edge of said strip comprises a guide block having a shaped groove adapted to receive said strip.

5. The apparatus of claim 1, wherein said means for aligning the second edge of said strip with said second heat sealing station comprises a second guide block having a shaped groove adapted to receive said strip.

6. The apparatus of claim 1, wherein said means for aligning the edge of the other of said plies with said second heat sealing station comprises at least one nip roller assembly.

7. The apparatus of claim 1, wherein said means for supplying said two contiguous plies of material comprises a supply carriage and means for supplying said plies of heat-weldable material in offset relationship.

8. The apparatus of claim 7, wherein said means for aligning the edge of said one of said plies with said first heat sealing station comprises sensing means for sensing deviations of said last mentioned edge from a predetermined location and means responsive to said sensing means for moving said supply carriage to reduce said deviation.

9. The apparatus of claim 7, further including guide means for maintaining said plies in a generally horizontal plane as the plies are fed through said first and second heat sealing stations.

10. The apparatus of claim 7, further including take-up reel means for continuously drawing said plies and said strip through said apparatus and along said sealing path at a selected speed.

11. The apparatus of claim 10, further including controlled motor means for driving said take-up reel to maintain a constant tension on said plies.

12. The apparatus of claim 11, wherein said two plies comprise the upper and lower portions of a J-folded sheet of material, and wherein said strip is a fastener strip adapted to be heat-welded between the edges of said sheet.

13. An apparatus for continuously assembling stock material by heat-welding the edges of a fastener strip between corresponding adjacent edges of the upper and lower plies of a sheet, comprising:

frame means;

first and second heat sealer units horizontally supported on said frame means wherein each of said heat sealer units is a rotary belt sealer having a heating bar, a cooling bar, belt means for carrying said sheet and said fastener strip past said heating and cooling bars, and lifter means for adjusting the position of said bars with respect to said belt;

means for guiding the first edge of said fastener strip and the edge of said upper ply into said first heat sealer unit;

means for guiding the second edge of said fastener strip and the edge of said lower ply into said second heat sealer unit; and take-up means for drawing said sheet and said fastener strip continuously through said first and second heat sealer units at a substantially constant speed and at a substantially constant tension.

14. The apparatus of claim 13, wherein said lifter means comprises means for moving said heating and cooling bars away from said sheet and fastener strip when said belt means is stopped.

15. The apparatus of claim 13, further including guide means secured to said first heat sealer unit for preventing said lower ply of said sheet from entering said first heat sealer unit.

16. The apparatus of claim 13, further including means for maintaining said sheet in a generally horizontal configuration as it is drawn through said first and second heat sealer units.

17. The apparatus of claim 16, wherein said means for maintaining said sheet in a generally horizontal configuration comprises a first guide roller mounted on said frame means adjacent said first heat sealer unit and a second guide roller mounted on said frame means between said second heat sealer and said take-up means, said guide rollers being generally in a horizontal plane and mutually parallel and having friction surfaces for engaging said sheet.

18. The apparatus of claim 17, wherein said means for maintaining said sheet in a generally horizontal configuration further comprises at least one nip roller assembly and at least one check roller assembly mounted on said frame means between said first and second heat sealer units, said nip roller assembly and said check roller assembly being so disposed as to hold said sheet taut as it passes from said first heat sealer unit to said second heat sealer unit.

19. The apparatus of claim 13, further including supply means for supplying said sheet and said fastener strip to said heat sealer units sequentially.

20. The apparatus of claim 19, wherein said supply means includes individual supply rolls mounted on said frame for said sheet and for said fastener strip, said supply rolls each having brake means for producing tension on said sheet and said fastener strip.

21. The apparatus of claim 20, wherein said means for guiding the edge of said upper ply comprises sensing means at the desired location of said upper ply edge, and means responsive to said sensing means for adjusting the location of said edge.

22. The apparatus of claim 21, wherein said means for guiding the edge of said upper ply further includes carriage means movably mounted on said frame and adapted to carrying said sheet supply means, said means responsive to said sensing means including means for moving said carriage means transversely of the direction of movement of said sheet as it is fed to said first heat sealer unit.

23. The apparatus of claim 22, wherein said sensing means is sensitive to the presence of said upper ply edge at said desired location to move said carriage one way and is sensitive to the absence of said upper ply edge at said desired location to move said carriage the other way, whereby said carriage follows a reciprocating motion to cause said upper ply edge to hunt about said desired location.

24. The apparatus of claim 13, wherein said first and second heat sealer units are at spaced locations along the path followed by said sheet, said sheet passing through said first heat sealer unit and then through said second heat sealer unit in sequence.

25. The apparatus of claim 24, wherein said heat sealer units are adjacent the edges of said upper and lower plies, whereby only the portions of said ply and said strip to be sealed pass through the corresponding heat sealer unit.

References Cited

UNITED STATES PATENTS

| | | | |
|---|---|---|---|
| 3,202,559 | 8/1965 | Laguerre | 156—66 |
| 3,607,538 | 9/1971 | Fuller et al. | 156—271 |
| 3,328,220 | 6/1967 | Harding | 156—202 |
| 3,470,050 | 9/1969 | Michels et al. | 156—164 |
| 2,469,972 | 5/1949 | Lowry et al. | 156—498 |
| 3,720,559 | 3/1973 | Odom et al. | 156—202 |
| 3,738,587 | 6/1973 | Cristiani | 242—58.1 |

WILLIAM A. POWELL, Primary Examiner

B. J. LEITTEN, Assistant Examiner

U.S. Cl. X.R.

156—157, 324, 465, 583